United States Patent
Noda et al.

(10) Patent No.: US 8,121,284 B2
(45) Date of Patent: Feb. 21, 2012

(54) INFORMATION PROCESSING SYSTEM, INFORMATION PROCESSING METHOD, AND INFORMATION PROCESSING PROGRAM

(75) Inventors: Jun Noda, Tokyo (JP); Yuichi Nino, Tokyo (JP)

(73) Assignee: NEC Corporation, Tokyo (JP)

( * ) Notice: Subject to any disclaimer, the term of this patent is extended or adjusted under 35 U.S.C. 154(b) by 644 days.

(21) Appl. No.: 12/223,926

(22) PCT Filed: Mar. 13, 2007

(86) PCT No.: PCT/JP2007/054906
§ 371 (c)(1),
(2), (4) Date: Aug. 13, 2008

(87) PCT Pub. No.: WO2007/105709
PCT Pub. Date: Sep. 20, 2007

(65) Prior Publication Data
US 2010/0246809 A1    Sep. 30, 2010

(30) Foreign Application Priority Data
Mar. 14, 2006    (JP) .................................. 2006-069563

(51) Int. Cl.
*H04L 9/00*    (2006.01)
(52) U.S. Cl. ........................................................ 380/29
(58) Field of Classification Search .................. None
See application file for complete search history.

(56) References Cited

U.S. PATENT DOCUMENTS

| 5,796,836 | A | 8/1998 | Markham |
| 6,732,271 | B1 | 5/2004 | Sako et al. |
| 7,177,424 | B1 * | 2/2007 | Furuya et al. ................... 380/37 |
| 7,251,326 | B2 | 7/2007 | Kurdziel |

FOREIGN PATENT DOCUMENTS

| JP | 10-508450 | 8/1998 |
| JP | 2000-295212 A | 10/2000 |
| JP | 2001-007800 A | 1/2001 |
| JP | 2001-177518 | 6/2001 |
| JP | 2001-285281 A | 10/2001 |

(Continued)

OTHER PUBLICATIONS

Secure Hash Standard, Federal Information Processing Standards Publication 180-2, Aug. 1, 2002, 27 pages.

(Continued)

*Primary Examiner* — Brandon Hoffman
(74) *Attorney, Agent, or Firm* — Foley & Lardner LLP

(57) ABSTRACT

To provide an architecture information processing system having a small circuit size capable of reducing power consumption and cost, on which system a circuit simultaneously executing encryption processing and message authentication (falsification detection processing) can be mounted. An information processing system includes at least: a parameter storage section that retains an initialization vector used as a starting block of concatenation and an encryption key used for encryption; a one-way hash calculation section that executes a one-way hash calculation as a technique for realizing message authentication and functioning in place of the conventional common key block encryption (DES encryption) operation as an encryption operation section of a block encryption mode use section performing encryption processing and/or decryption processing as a CFB mode and/or an OFB mode; and a key overlay operation section that performs calculation for overlaying an encryption key retained in the parameter storage unit on data input to the encryption operation section.

24 Claims, 6 Drawing Sheets

FOREIGN PATENT DOCUMENTS

| | | |
|---|---|---|
| JP | 2002-049310 A | 2/2002 |
| JP | 2002-287634 A | 10/2002 |
| JP | 2003-158515 A | 5/2003 |
| JP | 2004-045641 A | 2/2004 |
| JP | 2004-186930 A | 7/2004 |
| JP | 2004-531778 A | 10/2004 |
| JP | 2004-325677 A | 11/2004 |
| JP | 2005-134478 A | 5/2005 |

OTHER PUBLICATIONS

C. Rifest, MDS Message—Digest Algorithm, Apr. 1992, MIT Laboratory for Computer Science and RSA Data Security, Inc., http://www.jetf.org/rfc/rfo1321.txt.

H. Ootsuka et al., "Software Implementation of FEAL-NX". NTT Information Sharing Platform Labs., 5 pages, Sep. 2000.

\* cited by examiner

US 8,121,284 B2

INFORMATION PROCESSING SYSTEM, INFORMATION PROCESSING METHOD, AND INFORMATION PROCESSING PROGRAM

This application is the National Phase of PCT/JP2007/054906, filed Mar. 13, 2007, which claims priority to Japanese Application No. 2006-069563, filed Mar. 14, 2006, the disclosures of which are hereby incorporated by reference in their entirety.

TECHNICAL FIELD

The present invention relates to an information processing system, an information processing method, and an information processing program and is suitably applied to a case where encryption processing and message authentication are simultaneously achieved in a sensor network node where a circuit scale needs to be made small as a technique for ensuring security of confidential information.

BACKGROUND ART

Along with recent development of a communication network, a study (information security) for realizing a security function has been carried out extensively by encryption processing algorithm and protocol. There is a variety of encryption processing algorithms, which can be roughly classified into a public key encryption method and a shared-key encryption method. As disclosed in Non-Patent Document 1, when emphasis is placed on simplicity of implementation and processing speed, the public key encryption method is used more commonly than the shared-key encryption method. There is well known, as an algorithm of the shared-key encryption method, a shared-key block encryption (e.g., DES (Data Encryption Standard)). The shared-key block encryption is composed of two algorithms: encryption E and decryption $E^{\{-1\}}$. With respect to a given key k, the decryption $E^{\{-1\}}$ is the inverse function of the encryption E, and the following relationship:

$$E^{\{-1\}}(E(m))=m \text{ (}m\text{ is a given block)}$$

is satisfied.

The input block of an encryption algorithm and output block of a decryption algorithm are referred to as "plain text", and output block of the encryption algorithm and input block of the decryption algorithm are referred to as "cipher text". There is known, as a mechanism for encrypting a plain text longer than the block length, an encryption use mode which is treated as a known technique in, e.g., Patent Document 1: JP 2004-45641A "Encryption processing device and method therefor".

For example, according to Patent Document 1, a CFB (cipher feedback) mode which is one mode of the encryption use modes has a structure shown in FIG. 5. That is, IV (initial vector) data is retained by a register 2a in the initial state, and the IV data is then encrypted in a DES encryption calculation section 1a, followed by output of encrypted data E. Subsequently, random number data R is extracted from data corresponding to the upper k bits of the encrypted data E, and the extracted random number data R and a k-bit message M are XORed to generate a k-bit cipher text C. The generated k-bit cipher text C is added to the lower bit side of the IV data retained in the register 2a, and the resultant data is retained in the register 2a with its upper k-bit data discarded. Random data of a cipher text to be transmitted next time is generated using this updated data.

On the reception side of the cipher text C, the IV data is retained in the register 2b in the initial state, the IV data is then encrypted in a DES encryption calculation section 1b, followed by output of the encrypted data E. Subsequently, the random number data R is extracted from data corresponding to the upper k bits of the encrypted data E, and the extracted random number data R and a k-bit cipher text C are XORed to restore a k-bit message M. The received k-bit cipher text C is added to the lower bit side of the IV data retained in the register 2b, and the resultant data is retained in the register 2a with the its upper k-bit data discarded. Random data to be XORed with a cipher text to be received next time is generated using this updated data.

Similarly, according to Patent Document 1, an OFB (output feedback) mode which is one mode of the encryption use modes has a structure shown in FIG. 6. That is, in the OFB mode, 64-bit IV data is retained by a register 2a in the initial state, and the IV data is then encrypted in a DES encryption calculation section 1a, followed by output of encrypted data E. Subsequently, random number data R is extracted, by a data extraction section 4a, from data corresponding to the upper k (k is an integer from 0 to 64) bits of the encrypted data E, and the extracted random number data R and a message M are XORed in a calculation circuit 3a. From the calculation result, a k-bit cipher text C is obtained.

The random data R is added to the lower bit side of the IV data retained in the register 2a, and data corresponding to the upper k bits of the resultant data is discarded. Thus obtained 64-bit data is newly retained in the register 2a and is used for generating random data of a cipher text to be transmitted next time.

Also on the reception side of the cipher text C, the same random data R is generated by the same configuration, and the generated random data R and cipher text C are XORed to restore the original message M.

The message authentication is a procedure that verifies the identity of a message, i.e., data to be exchanged between a transmitter and receiver to confirm that the message has not been falsified by an illegal activity using a computer virus or hacking attack. A typical method of the message authentication is one using Message Authentication Codes (MAC) generated using a one-way hash calculation. The one-way hash value of a message m:

$$x=H(m)$$

is calculated and the obtained x is stored. If the message m is replaced by a message m' by falsification, $$x \ne H(m')$$

is satisfied, so that it is understood that the message has been falsified.

The one-way hash calculation is a calculation that compresses a message having a given length into a message with a specified length. The original message can never be restored from the compressed message.

Patent Document 1: JP 2004-45641A (pages 29 to 31)
Non-Patent Document 1: "Software implementation of FEAL-NX" written by Hiroaki Ootsuka and Hiroki Ueda (NTT)

DISCLOSURE OF THE INVENTION

Problems to be Solved by the Invention

Conventionally, the encryption processing and message authentication (falsification detection processing) are performed independently of each other. As a result, in the case where it is necessary to provide both an encryption system and authentication system, they need to be mounted as independent mechanisms. This makes the circuit configuration large and complicated, causing inconvenience. In particular, an apparatus (sensor node) provided in a sensor network has a limited space in which the circuit can be mounted, so that it is difficult to mount all the required mechanisms. Further, the current consumption or manufacturing cost of the circuit increases in proportion to the circuit scale, so that in order to achieve low power consumption or low manufacturing cost, an architecture for reducing the circuit scale is required.

The present invention has been made in view of the above situation, and an object thereof is to provide an information processing system, an information processing method, and an information processing program capable of simultaneously achieving both the encryption processing and message authentication while sharing and simplifying a mechanism to be mounted for performing the encryption processing and message authentication as much as possible.

Means for Solving the Problems

To solve the above problems, an information processing system, an information processing method, and an information processing program according to the present invention adopt the following characteristic configurations.

(1) An information processing system using, in place of a shared key block encryption calculation, a one-way hash calculation which is a technique for achieving message authentication as calculation that converts input data into encrypted blocks for shared key and that can be performed as a CFB (cipher feedback) mode and/or OFB (output feedback) mode.

(2) The information processing system according to (1), comprising at least: a block encryption mode use means for executing encryption processing and/or decryption processing as the CFB mode and/or OFB mode which are encryption use modes; a one-way hash calculation means for functioning, in place of the shared key block encryption calculation, as an encryption calculation section in the block encryption mode use means; a parameter storage means for retaining an initial vector used as a starting block of concatenation in the block encryption mode use means and an encryption key used for encryption processing; and a key overlay calculation means for performing calculation of overlaying the encryption key retained in the parameter storage means on the data input to the encryption calculation section in the block encryption mode use means.

(3) The information processing system according to (2), wherein the block encryption mode use means divides an input plain text into a plurality of blocks according to the bit length output from the one-way hash calculation means, applies, if necessary, padding to the last block and, assuming that each of respective blocks of the plain text is represented as $P[i]$ ($1 \leq i \leq n$), each of respective blocks of a cipher text corresponding to the blocks $P[i]$ of the plain text is as $C[i]$ ($1 \leq i \leq n$), an initial vector and an encryption key retained in the parameter storage means are as IV and k, respectively, calculation performed in the one-way hash calculation means is as $h(\cdot)$, exclusive OR is as $\bigcirc$, and calculation performed in the key overlay calculation means is as $\circledcirc$, executes encryption processing and decryption processing according to the CFB mode such that $$C[i]=P[i]\bigcirc h(k\circledcirc C[i-1])$$

where $P[0]=C[0]=IV$, $1 \leq i \leq n$ (n and i are integer values)

$$P[i]=C[i]\bigcirc h(k\circledcirc C[i-1])$$

where $P[0]=C[0]=IV$, $1 \leq i \leq n$ (n and i are integer values).

(4) The information processing system according to (2), wherein the block encryption mode use means divides an input plain text into a plurality of blocks according to the bit length output from the one-way hash calculation means, applies, if necessary, padding to the last block and, assuming that each of respective blocks of the plain text is represented as $P[i]$ ($1 \leq i \leq n$), each of respective blocks of a cipher text corresponding to the blocks $P[i]$ of the plain text is as $C[i]$, an initial vector and an encryption key retained in the parameter storage means are as IV and k, respectively, calculation performed in the one-way hash calculation means is as $h(\cdot)$, exclusive OR is as $\bigcirc$, calculation performed in the key overlay calculation means is as $\circledcirc$, and a state where the respective blocks are independent of both the plain text and cipher text is represented as $S[i]$ ($1 \leq i \leq n$), executes encryption processing and decryption processing according to the OFB mode such that $$C[i]=P[i]\bigcirc S[i]; \; S[i]=h(k\circledcirc S[i-1])$$

where $P[0]=C[0]=IV$, $1 \leq i \leq n$ (n and i are integer values)

$$P[i]=C[i]\bigcirc S[i]; \; S[i]=h(k\circledcirc S[i-1])$$

where $P[0]=C[0]=IV$, $1 \leq i \leq n$ (n and i are integer values).

(5) The information processing system according to any of (2) to (4), wherein the one-way hash calculation means has a hash function that receives input of data of a given bit length and outputs a hash value of a fixed length and calculates a hash value having one-wayness in which, when a one bit change is made in the input data, the half number of bits of the hash value are changed on average and therefore the original plain text cannot be generated from the hash value.

(6) The information processing system according to any of (2) to (5), wherein the parameter storage means stores an initial vector to be input to the block encryption mode use means and an encryption key to be input to the key overlay calculation means.

(7) The information processing system according to any of (2) to (6), wherein the key overlay calculation means synthesizes the data input from the block encryption mode use means and the encryption key input from the parameter storage means using one of the calculations including a bit concatenation calculation, an exclusive OR calculation, and a calculation that alternately mixes both the input data and encryption key n-bit ($1 \leq n$) by n-bit.

(8) An information processing method using, in place of a shared key block encryption calculation, a one-way hash calculation which is a technique for achieving message authentication as calculation that converts input data into encrypted blocks for shared key and that can be performed as a CFB (cipher feedback) mode and/or OFB (output feedback) mode.

(9) The information processing method according to (8), comprising at least: a block encryption mode use step of executing encryption processing and/or decryption processing as the CFB mode and/or OFB mode which are encryption use modes; a one-way hash calculation step of functioning, in place of the shared key block encryption calculation, as an encryption calculation processing in the block encryption mode use step; a parameter storage step of retaining an initial vector used as a starting block of concatenation in the block encryption mode use step and an encryption key used for encryption processing; and a key overlay calculation step of performing calculation of overlaying the encryption key retained in the parameter storage step on the data input to the encryption calculation processing in the block encryption mode use step.

(10) The information processing method according to (9), wherein the block encryption mode use step divides an input plain text into a plurality of blocks according to the bit length output from the one-way hash calculation step, applies, if necessary, padding to the last block and, assuming that each of respective blocks of the plain text is represented as P[i] ($1 \leq i \leq n$), each of respective blocks of a cipher text corresponding to the blocks P[i] of the plain text is as C[i] ($1 \leq i \leq n$), an initial vector and an encryption key retained in the parameter storage step are as IV and k, respectively, calculation performed in the one-way hash calculation step is as h(·), exclusive OR is as ◯, and calculation performed in the key overlay calculation step is as ⊚, executes encryption processing and decryption processing according to the CFB mode such that $$C[i]=P[i] \bigcirc h(k \otimes C[i-1])$$

where P[0]=C[0]=IV, $1 \leq i \leq n$ (n and i are integer values)

$$P[i]=C[i] \bigcirc h(k \otimes C[i-1])$$

where P[0]=C[0]=IV, $1 \leq i \leq n$ (n and i are integer values).

(11) The information processing method according to (9), wherein the block encryption mode use step divides an input plain text into a plurality of blocks according to the bit length output from the one-way hash calculation step, applies, if necessary, padding to the last block and, assuming that each of respective blocks of the plain text is represented as P[i] ($1 \leq i \leq n$), each of respective blocks of a cipher text corresponding to the blocks P[i] of the plain text is as C[i] ($1 \leq i \leq n$), an initial vector and an encryption key retained in the parameter storage step are as IV and k, respectively, calculation performed in the one-way hash calculation step is as h(·), exclusive OR is as ◯, calculation performed in the key overlay calculation step is as ⊚, and a state where the respective blocks are independent of both the plain text and cipher text is represented as S[i] ($1 \leq i \leq n$), executes encryption processing and decryption processing according to the OFB mode such that $$C[i]=P[i] \bigcirc S[i]; \; S[i]=h(k \otimes S[i-1])$$

where P[0]=C[0]=IV, $1 \leq i \leq n$ (n and i are integer values)

$$P[i]=C[i] \bigcirc S[i]; \; S[i]=h(k \otimes S[i-1])$$

where P[0]=C[0]=IV, $1 \leq i \leq n$ (n and i are integer values).

(12) The information processing method according to any of (9) to (11), wherein the one-way hash calculation step has a hash function that receives input of data of a given bit length and outputs a hash value of a fixed length and calculates a hash value having one-wayness in which, when a one bit change is made in the input data, the half number of bits of the hash value are changed on average and therefore the original plain text cannot be generated from the hash value.

(13) The information processing method according to any of (9) to (12), wherein the parameter storage step stores an initial vector to be input to the block encryption mode use step and an encryption key to be input to the key overlay calculation step.

(14) The information processing method according to any of (9) to (13), wherein the key overlay calculation step synthesizes the data input from the block encryption mode use step and the encryption key input from the parameter storage step using one of the calculations including a bit concatenation calculation, an exclusive OR calculation, and a calculation that alternately mixes both the input data and encryption key n-bit ($1 \leq n$) by n-bit.

(15) An information processing program using, in place of a shared key block encryption calculation, a one-way hash calculation which is a technique for achieving message authentication as calculation that converts input data into encrypted blocks for shared key and that can be performed as a CFB (cipher feedback) mode and/or OFB (output feedback) mode.

(16) The information processing program according to (15), comprising at least: a block encryption mode use step of executing encryption processing and/or decryption processing as the CFB mode and/or OFB mode which are encryption use modes; a one-way hash calculation step of functioning, in place of the shared key block encryption calculation, as an encryption calculation processing in the block encryption mode use step; a parameter storage step of retaining an initial vector used as a starting block of concatenation in the block encryption mode use step and an encryption key used for encryption processing; and a key overlay calculation step of performing calculation of overlaying the encryption key retained in the parameter storage step on the data input to the encryption calculation processing in the block encryption mode use step.

(17) The information processing program according to (16), wherein the block encryption mode use step divides an input plain text into a plurality of blocks according to the bit length output from the one-way hash calculation step, applies, if necessary, padding to the last block and, assuming that each of respective blocks of the plain text is represented as P[i] ($1 \leq i \leq n$), each of respective blocks of a cipher text corresponding to the blocks P[i] of the plain text is as C[i] ($1 \leq i \leq n$), an initial vector and an encryption key retained in the parameter storage step are as IV and k, respectively, calculation performed in the one-way hash calculation step is as h(·), exclusive OR is as ◯, and calculation performed in the key overlay calculation step is as ⊚, executes encryption processing and decryption processing according to the CFB mode such that $$C[i]=P[i] \bigcirc h(k \otimes C[i-1])$$

where P[0]=C[0]=IV, $1 \leq i \leq n$ (n and i are integer values)

$$P[i]=C[i] \bigcirc h(k \otimes C[i-1])$$

where P[0]=C[0]=IV, $1 \leq i \leq n$ (n and i are integer values).

(18) The information processing program according to (16), wherein the block encryption mode use step divides an input plain text into a plurality of blocks according to the bit length output from the one-way hash calculation step, applies, if necessary, padding to the last block and, assuming that each of respective blocks of the plain text is represented as P[i] ($1 \leq i \leq n$), each of respective blocks of a cipher text corresponding to the blocks P[i] of the plain text is as C[i] ($1 \leq i \leq n$), an initial vector and an encryption key retained in the parameter storage step are as IV and k, respectively, calculation performed in the one-way hash calculation step is as h(·), exclusive OR is as ◯, calculation performed in the key overlay calculation step is as ⊚, and a state where the respective blocks are independent of both the plain text and cipher text is represented as S[i] ($1 \leq i \leq n$), executes encryption processing and decryption processing according to the OFB mode such that $$C[i]=P[i] \bigcirc S[i]; \; S[i]=h(k \otimes S[i-1])$$

where P[0]=C[0]=IV, $1 \leq i \leq n$ (n and i are integer values)

$$P[i]=C[i] \bigcirc S[i]; \; S[i]=h(k \otimes S[i-1])$$

where P[0]=C[0]=IV, $1 \leq i \leq n$ (n and i are integer values).

(19) The information processing program according to any of (16) to (18), wherein the one-way hash calculation step has a hash function that receives input of data of a given bit length and outputs a hash value of a fixed length and calculates a hash value having one-wayness in which, when a one bit change is made in the input data, the half number of bits of the hash value are changed on average and therefore the original plain text cannot be generated from the hash value.

(20) The information processing program according to any of (16) to (19), wherein the parameter storage step stores an initial vector to be input to the block encryption mode use step and an encryption key to be input to the key overlay calculation step.

(21) The information processing program according to any of (16) to (20), wherein the key overlay calculation step synthesizes the data input from the block encryption mode use step and the encryption key input from the parameter storage step using one of the calculations including a bit concatenation calculation, an exclusive OR calculation, and a calculation that alternately mixes both the input data and encryption key n-bit ($1 \leq n$) by n-bit.

Advantages of the Invention

According to the information processing system, information processing method, and information processing program according to the present invention, the following advantages can be obtained.

The first advantage is that both encryption processing and decryption processing can be achieved only by a one-way hash calculation unit, so that it is not necessary to additionally implement both algorithms for encryption and decryption to be used in a shared key encryption calculation in order to simultaneously achieve both the encryption processing and message authentication processing, thereby suppressing an increase in circuit scale and achieving low power consumption and low cost by the effect of reduction in the comprehensive circuit scale.

The second advantage is that the one-way hash calculation often has less total calculation amount than a shared key encryption calculation in general and achieves further reduction in the calculation amount depending on an algorism used, which enables an increase in the throughput in encryption communication and achievement of low power consumption which is brought about by a reduction in processing time.

Figure 1:
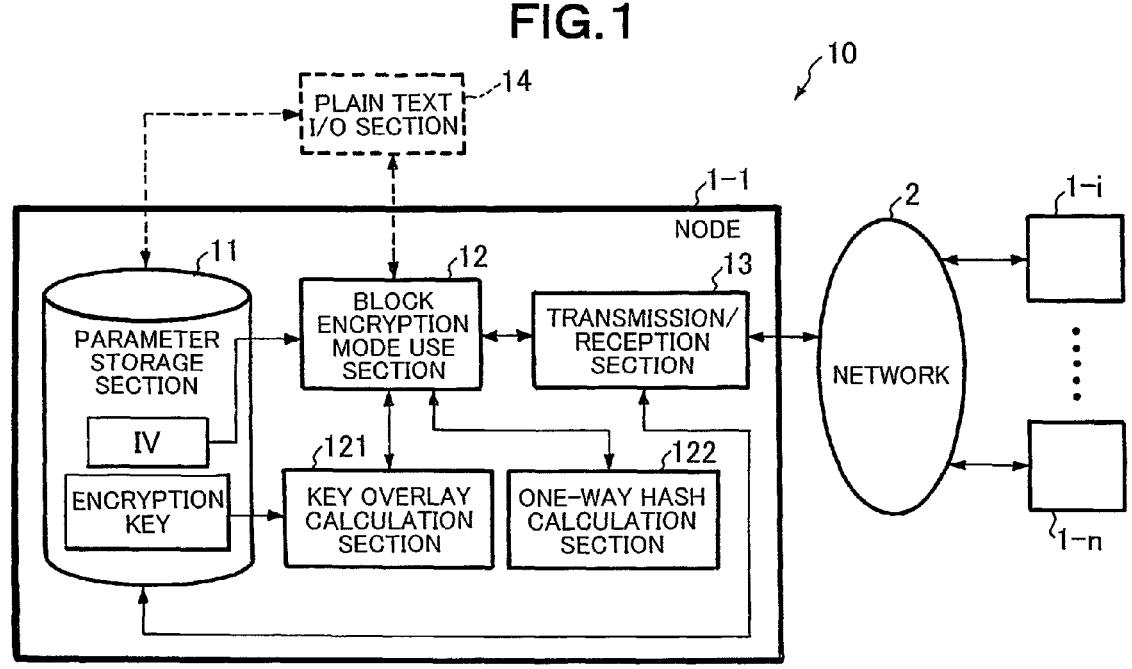
FIG. 1 is a configuration view showing an example of the entire configuration of an information processing system according to a preferred exemplary embodiment of the present invention.

EXPLANATION OF REFERENCE SYMBOLS 1-1 to 1-$n$: Node
1$a$, 1$b$: DES encryption calculation section
10: Information processing system
11: Parameter storage section
12: Block encryption mode use section
121: Key overlay calculation section
122: One-way hash calculation section
13: Transmission/reception section
14: Plain text I/O section
2: Network
2$a$, 2$b$: Register
3$a$, 3$b$: Calculation circuit
4$a$, 4$b$: Data extraction section

BEST MODE FOR CARRYING OUT THE INVENTION

Now, preferred exemplary embodiments of an information processing system, an information processing method, and an information processing program will be described by referring to the accompanying drawings.

FIG. 1 shows an example of the entire configuration of an information processing system according to a preferred exemplary embodiment of the present invention. Referring to FIG. 1, an information processing system 10 according to the present exemplary embodiment includes 1 to n nodes 1-$i$ ($1 \leq i \leq n$) which are connected to one another through a network 2 and performs encryption communication between the nodes 1-$i$. A node 1-1 includes at least a parameter storage section 11 serving as a parameter storage means, a block encryption mode use section 12 serving as a block encryption mode use means, a key overlay calculation section 121 serving as a key overlay means, a one-way hash calculation section 122 serving as a one-way hash calculation means, and a transmission/reception section 13 serving as an interface to a wireless or wired network 2 and may further include a plain text I/O section 14 serving as a means for inputting/outputting data to/from an external device. The configurations of other nodes 1-$j$ ($2 \leq j \leq n$) are same as that of the node 1-1, and, therefore, redundant descriptions thereof will be omitted.

In the node 1-1, an initial vector IV and an encryption key k are previously stored in the parameter storage section 11 in advance of the start of the following operation. At this time, the initial vector IV and encryption key k may be received from the plain text I/O section 14 for storage. As the initial vector IV, data that the transmission/reception section 13 receives through the network 2 may be stored. Also, as the encryption key k, data that the transmission/reception section 13 receives through the network 2 may directly be stored or data corresponding to a result calculated from the received data may be stored if there is no fear of leaking to the outside.

The initial vector IV needs to be non-overlapping and unique one but need not be kept secret. The initial vector IV may be, for example, one counted up in correspondence, one by one, with data to be encrypted, such as a serial number and is preferably one in which the same number does not appear until the lifetime of the encryption key expires. In the present exemplary embodiment, a configuration may be employed, in which the number of cipher texts exchanged between two nodes is counted in both the two nodes, and the count value is set as the initial vector IV at the time of encryption/decryption processing in encryption communication between the two nodes. As a matter of course, the initial vector IV may be added to all cipher texts to be transmitted to the network 2. Typically, the configuration may be such that the count value corresponding to the number of cipher texts is set as the initial vector IV and, only when the synchronization of the count value between the two nodes is lost due to communication failure or the like of the network 2, the initial vector IV is added to communication data to be transmitted to the network 2 for synchronization.

The block encryption mode use section 12 executes encryption processing and/or decryption processing as the CFB mode and/or OFB mode and operates in cooperation with the one-way hash calculation section 122 that functions in place of the conventional shared key block encryption (DES encryption) calculation section and key overlay calculation section 121 that performs calculation for overlaying an encryption key.

Figure 2:
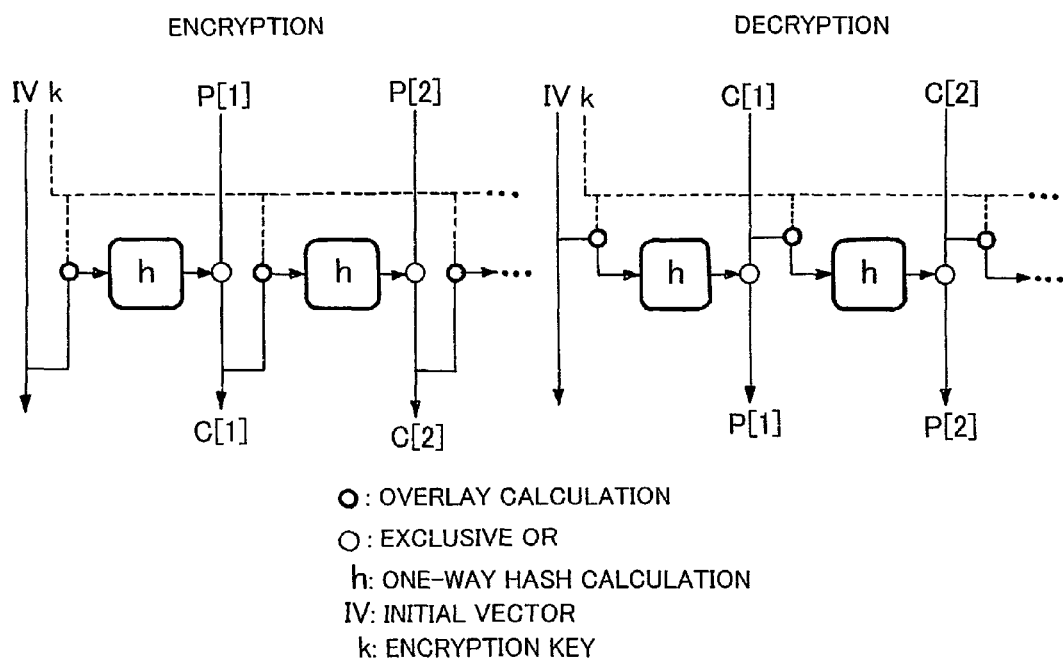
FIG. 2 is a conceptual view for explaining a mechanism that uses a one-way hash calculation as a calculation that converts a block of plain text into a block of cipher text for shared key and that can be performed as a CFB mode.

That is, the block encryption mode use section 12 divides an input plain text into a plurality of blocks according to the bit length output from the one-way hash calculation section 122 and, if necessary, applies padding to the last block. Subsequently, assuming that each of respective blocks of the plain text is represented as P[i] ($1 \leq i \leq n$), each of respective blocks of a cipher text corresponding to the blocks P[i] of the plain text is as C[i] ($1 \leq i \leq n$), operation performed in the one-way hash calculation section 122 is as h(·), exclusive OR is as ◯, and calculation performed in the key overlay calculation section 121 is as ⊙, the block encryption mode use section 12 executes the same processing as the CFB (cipher feedback) mode except for using the one-way hash calculation in place of using the conventional encryption algorithm so as to encrypt respective blocks of the plain text such that, as shown in FIG. 2, $$C[i]=P[i] \bigcirc h(k \odot C[i-1])$$

where P[0]=C[0]=IV, $1 \leq i \leq n$ (n and i are integer values)

$$P[i]=C[i] \bigcirc h(k \odot C[i-1])$$

where P[0]=C[0]=IV, $1 \leq i \leq n$ (n and i are integer values).

Similarly, at the time of decrypting the cipher text, the block encryption mode use section 12 uses the one-way hash calculation to execute processing based on the CFB mode. FIG. 2 is a conceptual view for explaining a mechanism that uses the one-way hash calculation as a calculation that converts the blocks of plain text into blocks of cipher text for shared key and that can be performed as the CFB mode.

Figure 3:
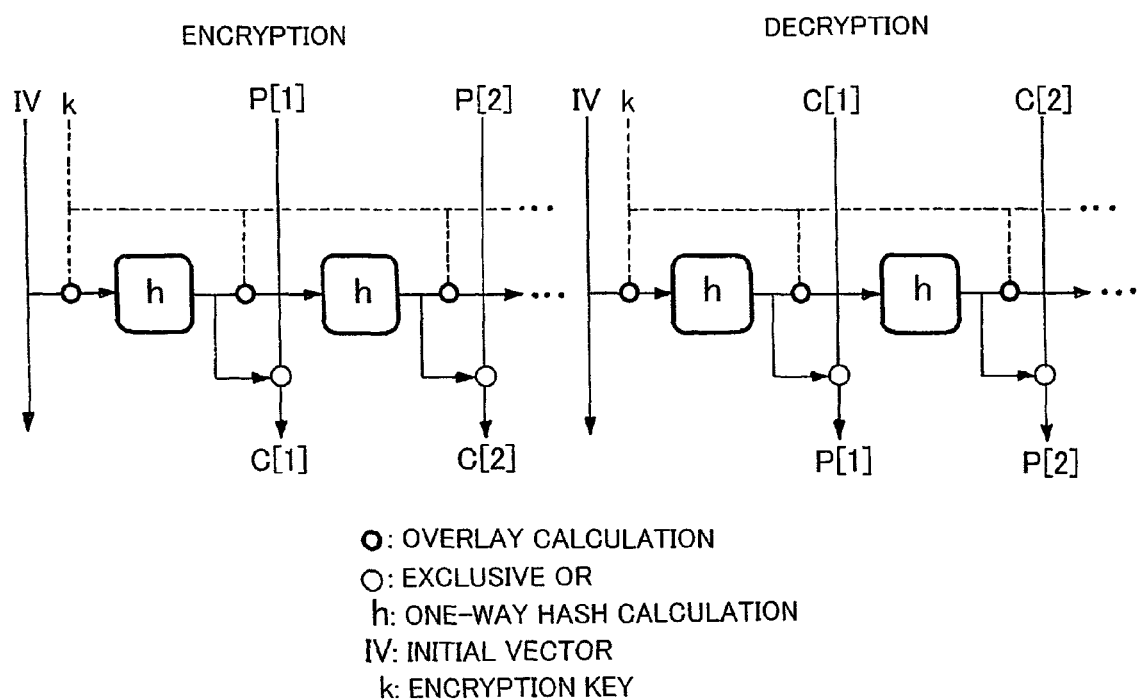
FIG. 3 is a conceptual view for explaining a mechanism that uses a one-way hash calculation as a calculation that converts a block of plain text into a block of cipher text for shared key and that can be performed as an OFB mode.

Alternatively, assuming that a state where the respective blocks are independent of both the plain text and cipher text is represented as S[i] ($1 \leq i \leq n$), the block encryption mode use section 12 executes the same processing as the OFB (output feedback) mode except for using the one-way hash calculation in place of using the conventional encryption algorithm so as to encrypt respective blocks of the plain text such that, as shown in FIG. 3, $$C[i]=P[i] \bigcirc S[i]; \; S[i]=h(k \odot S[i-1])$$

where P[0]=C[0]=IV, $1 \leq i \leq n$ (n and i are integer values)

$$P[i]=C[i] \bigcirc S[i]; \; S[i]=h(k \odot S[i-1])$$

where P[0]=C[0]=IV, $1 \leq i \leq n$ (n and i are integer values). Similarly, at the time of decrypting the cipher text, the block encryption mode use section 12 uses the one-way hash calculation to execute processing based on the OFB mode. FIG. 3 is a conceptual view for explaining a mechanism that uses the one-way hash calculation as a calculation that converts the blocks of plain text into blocks of cipher text for shared key and that can be performed as the OFB mode.

The plain text input to the block encryption mode use section 12 at the encryption time is input through the plain text I/O section 14. The plain text I/O section 14 may be an exterior sensor such as a thermometer, a hygrometer, a camera image sensor, a sound sensor, a vibration sensor, and a pressure sensor, and the measurement result thereof is treated as the plain text. Further, the cipher text input to the block encryption mode use section 12 at the decryption time is input through the transmission/reception section 13. The cipher text received by the transmission/reception section 13 is decrypted in the block encryption mode use section 12, and the plain text obtained as a result of the decryption is output through the plain text I/O section 14. At this time, when the last block of the original plain text has been subjected to padding, the padding portion is deleted appropriately by the block encryption mode use section 12.

The key overlay calculation section 121 performs processing of overlaying an encryption key on input data. More specifically, the key overlay calculation section 121 synthesizes the data input from the block encryption mode use section 12 and the encryption key input from the parameter storage section 11 using one of the calculations including bit concatenation calculation, exclusive OR operation, and calculation that alternately mixes both the input data and encryption key n-bit ($1 \leq n$) by n-bit and outputs the synthesis result to the block encryption mode use section 12. A use of such bit concatenation calculation as extending the domain space in the one-way hash calculation can reduce the collision probability of inputs to a hash function, as compared with the exclusive OR calculation in which the number of input bits and that of output bits are the same, thereby enhancing security.

The one-way hash calculation section 122 has a hash function that receives input of data of a given bit length and outputs a hash value of a fixed length and has one-wayness in which, when a one bit change is made in the input data, the half number of bits of the hash value are changed on average and therefore the original plain text cannot be generated from the hash value. As the hash function, existing algorisms, such as represented by SHA-1, SHA-256, SHA-384, SHA-512 described in "SECURE HASH STANDARD" (Federal Information Processing Standards Publication 180-2, 2002 Aug. 1) or represented by MD5 described in "The MD5 Message-Digest Algorithm" (Network Working Group Request for Comments: 1321, April 1992) can be used.

The network 2 is a network on which wireless or wired communication can be performed and all the nodes 1-1 to 1-$n$ can freely transmit/receive data.

Figure 4:
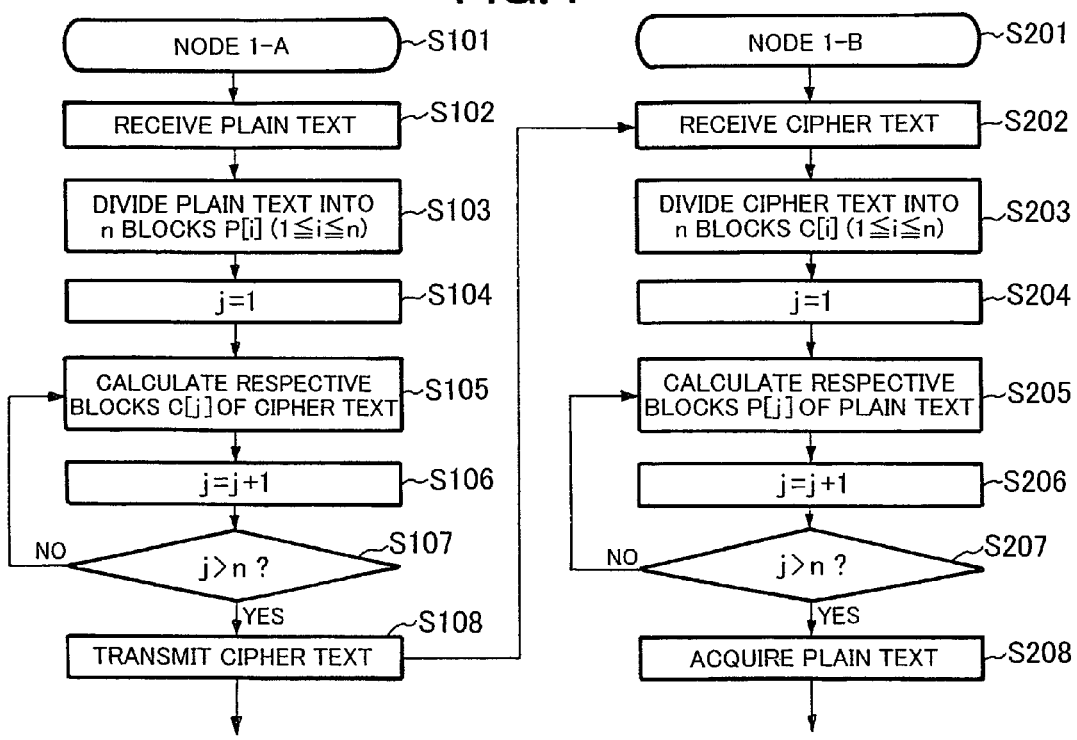
FIG. 4 is a flowchart showing operation of a preferred exemplary embodiment for practicing the information processing system according to the present invention.
Figure 5:
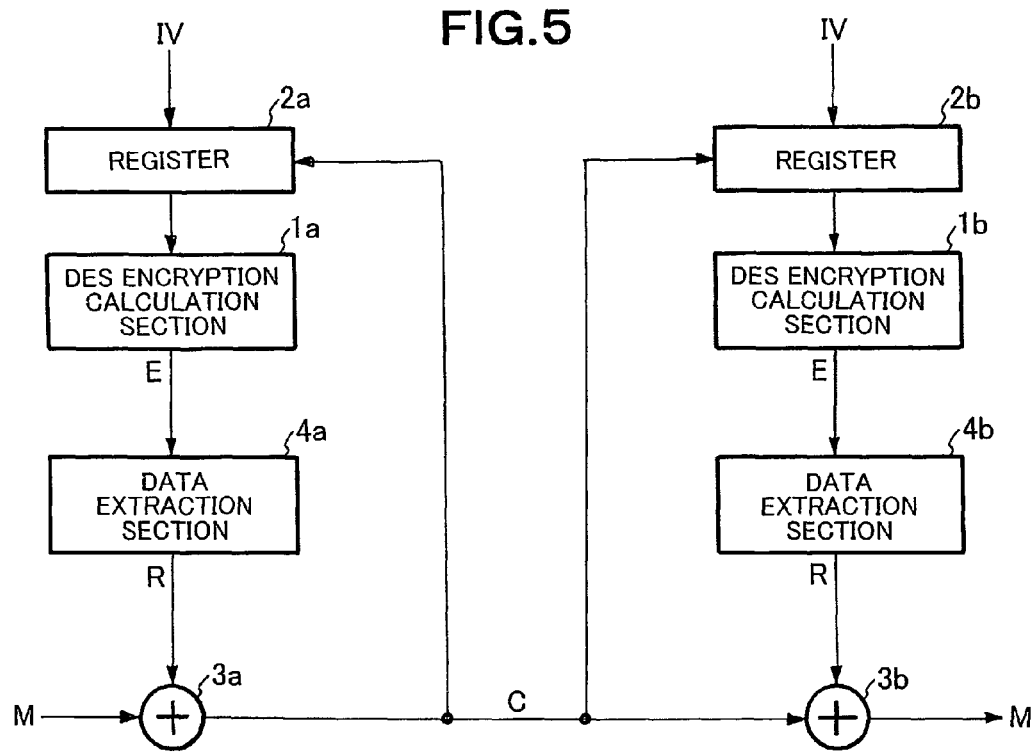
FIG. 5 is a conceptual view for explaining the outline of a CFB (cipher feedback) mode.
Figure 6:
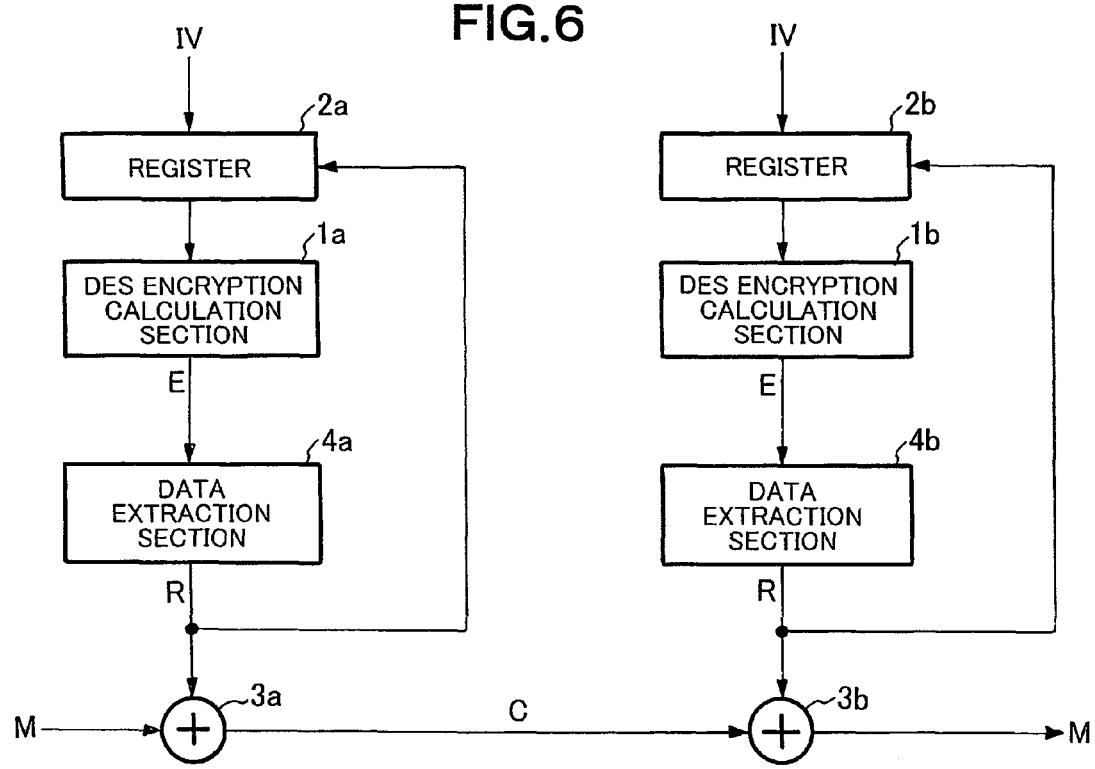
FIG. 6 is a conceptual view for explaining the outline of an OFB (output feedback) mode.

The entire operation of the information processing system 10 according to the present exemplary embodiment shown in FIG. 1 will be described with reference to the flowchart of FIG. 4. FIG. 4 is a flowchart showing operation of a preferred exemplary embodiment for practicing the information processing system according to the present invention. In FIG. 4, anode 1-A serves as a transmission source of the encryption communication, and a node 1-B serves as a transmission destination of the encryption communication.

The node 1-A receives, from the plain text I/O section 14 such as an exterior sensor, a plain text to be encrypted (step S102). Then, the block encryption mode use section 12 of the node 1-A divides the input plain text into a plurality of block P[i] ($1 \leq i \leq n$) according to the number of bits output from the one-way hash calculation section 122, applies, if necessary, padding to the last block P[n] of the divided plain text (step S103), and calculates each block C[j] ($1 \leq j \leq n$) of the cipher text (steps S104 to S107). After that, the node 1-A transmits the cipher text through the transmission/reception section 13 (step S108).

The node 1-B receives the cipher text from the node 1-A (step S202), divides the cipher text into a plurality of blocks C[i] ($1 \leq i \leq n$) according to the number of bits output from the one-way hash calculation section 122 (step S203), calculates each block P[j] of the plain text, and deletes the padding portion from the last block P[n] (steps S204 to S207). As a result, the plain text encrypted in the node 1-A can be decrypted (step S208).

Although preferred exemplary embodiments of the present invention have been shown and described, the exemplary embodiments are merely given as examples, and it should be understood that the present invention is not limited thereto. It will be easily apparent to those skilled in the art that a variety of modifications and alterations may be made according to specific applications without departing from the scope of the present invention.

The invention claimed is:

1. An information processing system that performs authentication using hash calculation, wherein
    said system is configured to:
    divide a plain text to be encrypted into n (n is a natural number) plain text blocks;
    set a first set value, which differs for each plain text, in the plain text to be encrypted;
    perform a hash calculation for a first calculation result which is obtained as a result of a first calculation performed for the first set value and an encryption key to output a first hash calculation result;
    output a result which is obtained as a result of a second calculation performed for an i-th (i is a natural number satisfying i≦n) hash calculation result and an i-th plain text block as an encrypted i-th cipher text block; and
    perform a hash calculation for a second calculation result which is obtained as a result of the first calculation performed for the i-th hash calculation result and encryption key to output an (i+1)th hash calculation result.

2. The information processing system according to claim 1, wherein
    said information processing system is further configured to adopt an encrypted cipher text as the plain text to obtain an original plain text as an encryption result.

3. The information processing system according to claim 1, comprising:
    block encryption mode use means for performing a hash calculation for a second calculation result obtained as the first calculation performed for the i-th hash calculation result and encryption key or i-th cipher block and encryption key to output an (i+1)th hash calculation result and selecting/setting an operand to be calculated by the first calculation at the time when the (i+1)th hash calculation result is output;
    one-way hash calculation means for performing a hash calculation in the block encryption mode use means; and
    parameter storage means for retaining the first set value which differs for each plain text and encryption key used for encryption processing.

4. The information processing system according to claim 1, wherein
    the first set value stored in the parameter storage means includes an initial vector which is managed such that it becomes unique not for each calculation performed by the hash calculation means but for each plain text and an encryption key which is common in a period during which initial vectors do not overlap with each other.

5. The information processing system according to claim 1, wherein
    the first calculation includes a bit concatenation calculation, an exclusive OR calculation, and a calculation that alternately mixes both the bit concatenation calculation and exclusive OR calculation.

6. The information processing system according to claim 1, wherein
    the second calculation is an exclusive OR calculation.

7. An information processing system that performs authentication using hash calculation, wherein
    said system is configured to:
    divide a plain text to be encrypted into n (n is a natural number) plain text blocks;
    set a first set value, which differs for each plain text, in the plain text to be encrypted;
    perform a hash calculation for a first calculation result which is obtained as a result of a first calculation performed for the first set value and an encryption key to output a first hash calculation result;
    output a result which is obtained as a result of a second calculation performed for an i-th (i is a natural number satisfying i≦n) hash calculation result and an i-th plain text block as an encrypted i-th cipher text block; and
    perform a hash calculation for a second calculation result which is obtained as a result of the first calculation performed for the i-th cipher text block and encryption key to output an (i+1)th hash calculation result.

8. The information processing system according to claim 7, wherein
    said system is further configured to:
    adopt an encrypted cipher text as the plain text; and
    perform a hash calculation for a second calculation result which is obtained as a result of the first calculation performed for the i-th plain text block and encryption key to output an (i+1)th hash calculation result, in place of performing a hash calculation for a second calculation result which is obtained as a result of the first calculation performed for the i-th cipher text block and encryption key to output an (i+1)th hash calculation result, to obtain an original plain text.

9. An information processing method that performs authentication using hash calculation, comprising:
    dividing a plain text to be encrypted into n (n is a natural number) plain text blocks;
    setting a first set value, which differs for each plain text, in the plain text to be encrypted;
    performing a hash calculation for a first calculation result which is obtained as a result of a first calculation performed for the first set value and an encryption key to output a first hash calculation result;
    outputting a result which is obtained as a result of a second calculation performed for an i-th (i is a natural number satisfying i-≦n) hash calculation result and an i-th plain text block as an encrypted i-th cipher text block; and
    performing a hash calculation for a second calculation result which is obtained as a result of the first calculation performed for the i-th hash calculation result and encryption key to output an (i+1)th hash calculation result.

10. The information processing method according to claim 9, further comprising:
    adopting an encrypted cipher text as the plain text to obtain an original plain text as an encryption result.

11. The information processing method according to claim 9, comprising:
    a block encryption mode use step of performing a hash calculation for a second calculation result obtained as the first calculation performed for the i-th hash calculation result and encryption key or i-th cipher block and encryption key to output an (i+1)th hash calculation result and selecting/setting an operand to be calculated by the first calculation at the time when the (i+1)th hash calculation result is output;

a one-way hash calculation step of performing a hash calculation in the block encryption mode use step; and a parameter storage step of retaining the first set value which differs for each plain text and encryption key used for encryption processing.

12. The information processing method according to claim 9, wherein the first set value stored in the parameter storage step includes an initial vector which is managed such that it becomes unique not for each calculation performed by the hash calculation means but for each plain text and an encryption key which is common in a period during which initial vectors do not overlap with each other.

13. The information processing method according to claim 9, wherein the first calculation includes a bit concatenation calculation, an exclusive OR calculation, and a calculation that alternately mixes both the bit concatenation calculation and exclusive OR calculation.

14. The information processing method according to claim 9, wherein the second calculation is an exclusive OR calculation.

15. An information processing method that performs authentication using hash calculation, comprising:

dividing a plain text to be encrypted into n (n is a natural number) plain text blocks;

setting a first set value, which differs for each plain text, in the plain text to be encrypted;

performing a hash calculation for a first calculation result which is obtained as a result of a first calculation performed for the first set value and an encryption key to output a first hash calculation result;

outputting a result which is obtained as a result of a second calculation performed for an i-th (i is a natural number satisfying i≦n) hash calculation result and an i-th plain text block as an encrypted i-th cipher text block; and performing a hash calculation for a second calculation result which is obtained as a result of the first calculation performed for the i-th cipher text block and encryption key to output an (i+1)th hash calculation result.

16. The information processing method according to claim 15, further comprising:

adopting an encrypted cipher text as the plain text; and performing a hash calculation for a second calculation result which is obtained as a result of the first calculation performed for the i-th plain text block and encryption key to output an (i+1)th hash calculation result, in place of performing a hash calculation for a second calculation result which is obtained as a result of the first calculation performed for the i-th cipher text block and encryption key to output an (i+1)th hash calculation result, to obtain an original plain text.

17. An information processing program that performs authentication using hash calculation, allowing a computer to execute processing of:

dividing a plain text to be encrypted into n (n is a natural number) plain text blocks;

setting a first set value, which differs for each plain text, in the plain text to be encrypted;

performing a hash calculation for a first calculation result which is obtained as a result of a first calculation performed for the first set value and an encryption key to output a first hash calculation value;

outputting a result which is obtained as a result of a second calculation performed for an i-th (i is a natural number satisfying i≦n) hash calculation result and an i-th plain text block as an encrypted i-th cipher text block; and performing a hash calculation for a second calculation result which is obtained as a result of the first calculation performed for the i-th hash calculation result and encryption key to output an (i+1)th hash calculation result.

18. The information processing program according to claim 17, further allowing a computer to execute processing of adopting an encrypted cipher text as the plain text to obtain an original plain text as an encryption result.

19. The information processing program according to claim 17, allowing a computer to execute processing of:

a block encryption mode use step of performing a hash calculation for a second calculation result obtained as the first calculation performed for the i-th hash calculation result and encryption key or i-th cipher block and encryption key to output an (i+1)th hash calculation result and selecting/setting an operand to be calculated by the first calculation at the time when the (i+1)th hash calculation result is output;

a one-way hash calculation step of performing a hash calculation in the block encryption mode use step; and a parameter storage step of retaining the first set value which differs for each plain text and encryption key used for encryption processing.

20. The information processing program according to claim 17, wherein the first set value stored in the parameter storage step includes an initial vector which is managed such that it becomes unique not for each calculation performed by the hash calculation means but for each plain text and an encryption key which is common in a period during which initial vectors do not overlap with each other.

21. The information processing program according to claim 17, wherein the first calculation includes a bit concatenation calculation, an exclusive OR calculation, and a calculation that alternately mixes both the bit concatenation calculation and exclusive OR calculation.

22. The information processing program according to claim 17, wherein the second calculation is an exclusive OR calculation.

23. An information processing program that performs authentication using hash calculation, allowing a computer to execute the processing of:

dividing a plain text to be encrypted into n (n is a natural number) plain text blocks;

setting a first set value, which differs for each plain text, in the plain text to be encrypted;

performing a hash calculation for a first calculation result which is obtained as a result of a first calculation performed for the first set value and an encryption key to output a first hash calculation value;

outputting a result which is obtained as a result of a second calculation performed for an i-th (i is a natural number satisfying i≦n) hash calculation result and an i-th plain text block as an encrypted i-th cipher text block; and performing a hash calculation for a second calculation result which is obtained as a result of the first calculation performed for the i-th cipher text block and encryption key to output an (i+1)th hash calculation result.

24. The information processing program according to claim 23, allowing a computer to execute processing of:

adopting an encrypted cipher text as the plain text; and performing a hash calculation for a second calculation result which is obtained as a result of the first calculation performed for the i-th plain text block and encryption key to output an (i+1)th hash calculation result, in place of performing a hash calculation for a second calculation result which is obtained as a result of the first calculation performed for the i-th cipher text block and encryption key to output an (i+1)th hash calculation result, to obtain an original plain text.

* * * * *